United States Patent [19]

Hanlon

[11] Patent Number: 5,779,243
[45] Date of Patent: Jul. 14, 1998

[54] PISTON RING SET FOR RECIPROCATING ENGINES

[75] Inventor: Paul C. Hanlon, Shepherdsville, Ky.

[73] Assignee: Delaware Capital Formation, Inc., Wilmington, Del.

[21] Appl. No.: 753,220

[22] Filed: Nov. 21, 1996

[51] Int. Cl.⁶ .................... F16J 9/14; F16J 9/20; F16J 9/28
[52] U.S. Cl. .................... 277/216; 277/221; 277/223
[58] Field of Search .................... 277/216, 220, 277/221, 223

[56] References Cited

U.S. PATENT DOCUMENTS

| Re. 31,005 | 8/1982 | Prasse et al. | 277/138 |
|---|---|---|---|
| 1,229,498 | 6/1917 | Moratta | |
| 1,274,038 | 7/1918 | Hilker | |
| 2,591,920 | 4/1952 | Colvin | 277/216 |
| 2,807,511 | 9/1957 | Fleming | 309/23 |
| 2,817,562 | 12/1957 | Fleming et al. | 309/4 |
| 3,749,559 | 7/1973 | Prasse | 29/191.2 |
| 3,936,295 | 2/1976 | Cromwell et al. | 277/216 |
| 4,161,321 | 7/1979 | Hendrixon et al. | 277/216 |
| 4,359,230 | 11/1982 | Bruni | 277/216 |
| 4,414,284 | 11/1983 | Ebihara | 277/223 |
| 4,449,721 | 5/1984 | Tsuge | 277/221 |
| 4,455,028 | 6/1984 | Johansson | 277/53 |
| 4,570,946 | 2/1986 | Tsuchiya et al. | 277/216 |
| 4,575,107 | 3/1986 | Umegawa | 277/221 |
| 4,629,200 | 12/1986 | Ruddy | 277/216 |
| 4,688,808 | 8/1987 | Iijima | 277/223 |
| 4,758,005 | 7/1988 | Fox | 277/221 |
| 5,001,965 | 3/1991 | Ruddy et al. | 92/193 |
| 5,253,878 | 10/1993 | Miura | 277/221 |

FOREIGN PATENT DOCUMENTS

| 0116263 | 12/1942 | Australia | 277/216 |
|---|---|---|---|
| 5106737 | 4/1993 | Japan | 277/223 |
| 6281005 | 10/1994 | Japan | 277/221 |
| 6300131 | 10/1994 | Japan | 277/223 |
| 83 | of 1858 | United Kingdom | 277/220 |

*Primary Examiner*—William A. Cuchlinski, Jr.
*Assistant Examiner*—John L. Beres
*Attorney, Agent, or Firm*—Maurice L. Miller, Jr.

[57] ABSTRACT

A set of split piston rings for use in a reciprocating engine is disclosed which includes a top ring, an intermediate ring and a scraper ring. The top ring has a first L-shaped end portion which covers two adjacent surfaces of a generally rectangularly shaped second end portion to form a lap joint having an internal air gap which extends between a downwardly opening slot at one end of the lap joint and an upwardly opening slot at the other end thereof. The intermediate ring includes a radially outer surface which forms an arc shaped taper from an upper surface of the ring downwardly and a outwardly to a lower surface thereof. The taper allows the outer surface to slide relatively freely over lubricating oil deposited on a cylinder wall without dragging an excessive amount of oil upwardly during an upward piston movement. The scraper ring includes a continuous friction reducing coating on upper, outer and lower surfaces of a skirt of the ring which maintains its friction reducing character long after the outer surface coating is worn away by rubbing upon a cylinder wall. The coating also enhances the oil wiping action of the scraper ring and remains effective after the outer coating is worn away.

15 Claims, 4 Drawing Sheets

PISTON RING SET FOR RECIPROCATING ENGINES

BACKGROUND OF THE INVENTION

This invention relates generally to piston rings used in internal combustion engines and, more specifically, to the top ring, intermediate rings and scraper rings used on the pistons of such engines.

Particularly with regard to conventional large bore natural gas or diesel fuel fired reciprocating engines, such as used in the pipeline transmission of natural gas, and otherwise, the pistons of such engines employ a set of split rings which include a top ring, up to five intermediate rings, and up to three lower scraper or wiper rings. The conventional top ring, being nearest the combustion chamber above the piston on which it is mounted typically encounters a large pressure differential there across. To reduce this pressure differential somewhat, a butt joint is provided in the top piston which permits a small amount of gas from the combustion chamber to leak through. The conventional intermediate rings below the top ring then share some of the large pressure differential that would otherwise occur only across the top ring. The leakage of combustion gas products that occurs through the butt joint of a conventional top ring is referred to as blow-by. While it is acceptable at relatively low volumes, it becomes unacceptably high after excessive wear in the outer surface of the conventional top ring, thus having an increasingly deleterious effect on engine efficiency. The long encountered problem with conventional top rings of the prior art is that, while the blow-by of a relatively new ring may be acceptable, the amount of blow-by continues to increase across the butt joint as the ring end gaps widen due to continual wear of the radially outer ring surface against the cylinder wall on which the ring slidably moves. It would be advantageous to use a split top ring wherein wear on the outer surface of the ring has substantially no effect on the amount of blow-by occurring through the ring joint so long as the joint maintains its integrity. The useful life of such a top ring would then be substantially greater than that of a conventional top ring.

Another difficulty encountered using such a conventional set of rings relates to the conventional intermediate rings in present use. These rings have a linearly tapered outer surface wherein the radial dimension of the upper surface of one such ring is less than the radial dimension of the lower surface of the ring. But because the taper is linear, a lower edge portion of the conventional ring will tend to scrape relatively large amounts of lubricating oil upwardly around the cylinder wall as the piston and ring travel upwardly. The upwardly scraped quantities of oil will become burned near the top of the piston stroke such that, over time, the remaining quantities of lubricating oil in the engine crankcase will be reduced. This will require the addition from time to time of ever increasing amounts of oil to the crankcase to replenish the oil lost by burning. It would therefore be advantageous to provide tapered intermediate rings for use in such engines which did not have the tendency to drag or scrape such large quantities of oil up the cylinder walls during upward travel of the piston.

A third difficulty encountered using such conventional ring sets is related to the conventional lower scraper rings. These rings are intended to scrape excessive amounts of oil downwardly along the cylinder wall as the piston travels downwardly from the top of its stroke which were splashed or otherwise deposited relatively high on the cylinder wall when the piston was previously at or near the upper end of its upward stroke. To accomplish this action, the outer surfaces of the scraper rings bear against the cylinder wall and are responsible for a great deal of friction. To reduce this friction, a conventional friction reducing coating, such as teflon, has been applied to the cylinder wall bearing surface of the conventional ring. The problem encountered is that this coating rapidly wears away, often before the engine is fully broken in to service. As a result, the sliding friction between the ring and the cylinder wall markedly increases, usually after only a very short period of service as compared to the overall life of the piston rings. It would be advantageous to provide a set of lower scraper rings wherein the friction reducing feature of the coating applied thereto would have a much extended useful life well beyond the break-in period of the usual engine.

By way of the present invention, these and other difficulties encountered using conventional piston ring sets of the type herein discussed are substantially reduced.

SUMMARY OF THE INVENTION

It is an object of this invention to provide a novel set of piston rings for an internal combustion engine.

It is another object of this invention to provide a novel split top ring for the piston of an internal combustion engine.

It is yet another object of this invention to provide a novel split intermediate ring for a piston of an internal combustion engine.

It is a further object of the present invention to provide a novel split scraper ring for a piston of an internal combustion engine.

Briefly, in accordance with the present invention, a set of rings for a piston of an internal combustion engine is provided. The set includes a split top ring in the form of a first annularly shaped resilient member which is sized for confinement in and around a first radially outwardly opening annular groove defined in and around a surface portion of an internal combustion engine piston relatively near an upper end of the piston. The first member projects radially out of the first piston groove for slidably bearing against a surrounding engine cylinder wall. The first member forms a lap joint between a first end portion and a second end portion thereof. The first end portion has an inverted L-shaped structure defining a circumferentially extending notch in and along a lower outer surface portion thereof. The second end portion has an axial dimension sized for close fitting within and along the notch between an overlapping surface of the first end portion and a lower surface portion of the first groove. The second end portion also has a radial dimension which is less than the radial dimension of the notch for defining a fluid passageway between opposing axially extending surfaces of the first and second end portions. The passageway extends between and communicates with a downwardly opening slot between the end portions which is located at a first end of the lap joint and an upwardly opening slot which is located at a second end of the lap joint. The set also includes at least one intermediate ring including a second annularly shaped resilient member sized for confinement in and around a second radially outwardly opening annularly shaped groove formed in and around a surface portion of the piston which is axially spaced below the first groove. The second member is also sized to project radially out of the second groove for slidably bearing against the cylinder wall. The second member defines an arc shaped outer surface for slidably bearing against the cylinder wall wherein a first radial dimension of the second member, as measured in and along a plane containing a lower surface of the second member, is greater than a second radial dimension of the second member as measured in and along a plane containing an upper surface of the second member. The set also includes at least one split scraper ring in the form of a third resilient annularly shaped member sized for confinement in and around a third radially outwardly opening annularly shaped groove formed in and around a surface portion of the piston which is spaced below the second groove and which is sized to project radially out of the third groove for slidably bearing against the cylinder wall. The third member includes at least one radially outwardly projecting skirt defining a diagonally downwardly and radially outwardly extending upper surface, an axially extending outer surface and a lower surface. The upper, outer and lower surfaces contain a continuous outer coating of polytetrafluorethylene containing fluoropolymers having a thickness of from about 0.0005 inches to about 0.002 inches.

These and other objects, features and advantages of the present invention will become apparent to those skilled in the art from the following detailed description and attached drawings upon which, by way of example, only a preferred embodiment of my invention is explained and illustrated.

DESCRIPTION OF THE PREFERRED EMBODIMENT

Referring now to the drawing figures there is shown, in a preferred embodiment of my invention, a conventional piston 10 (FIGS. 1-2 and 6-8) of the type commonly used in a cylinder 11 (FIGS. 4 and 6-8) of a conventional internal combustion engine. As a specific example, the piston 10 may be of the type used in large bore cylinders of a conventional natural gas or diesel fuel fired engine such as commonly employed in the long distance pipe line transmission of natural gas. The combustion chamber of a cylinder of such an engine is typically located immediately above an upper surface 14 of the piston 10 and a lubricating oil containing crankcase is located below a lower surface 16 of the piston. In accordance with my invention, the piston 10 contains a novel split top ring 18, a pair of novel split intermediate rings 20, and a pair of split oil wiper or scraper rings 22, which latter rings contain a novel continuous coating of otherwise conventional friction reducing fluoropolymers applied to various surfaces thereof as later more fully explained.

Figure 1:
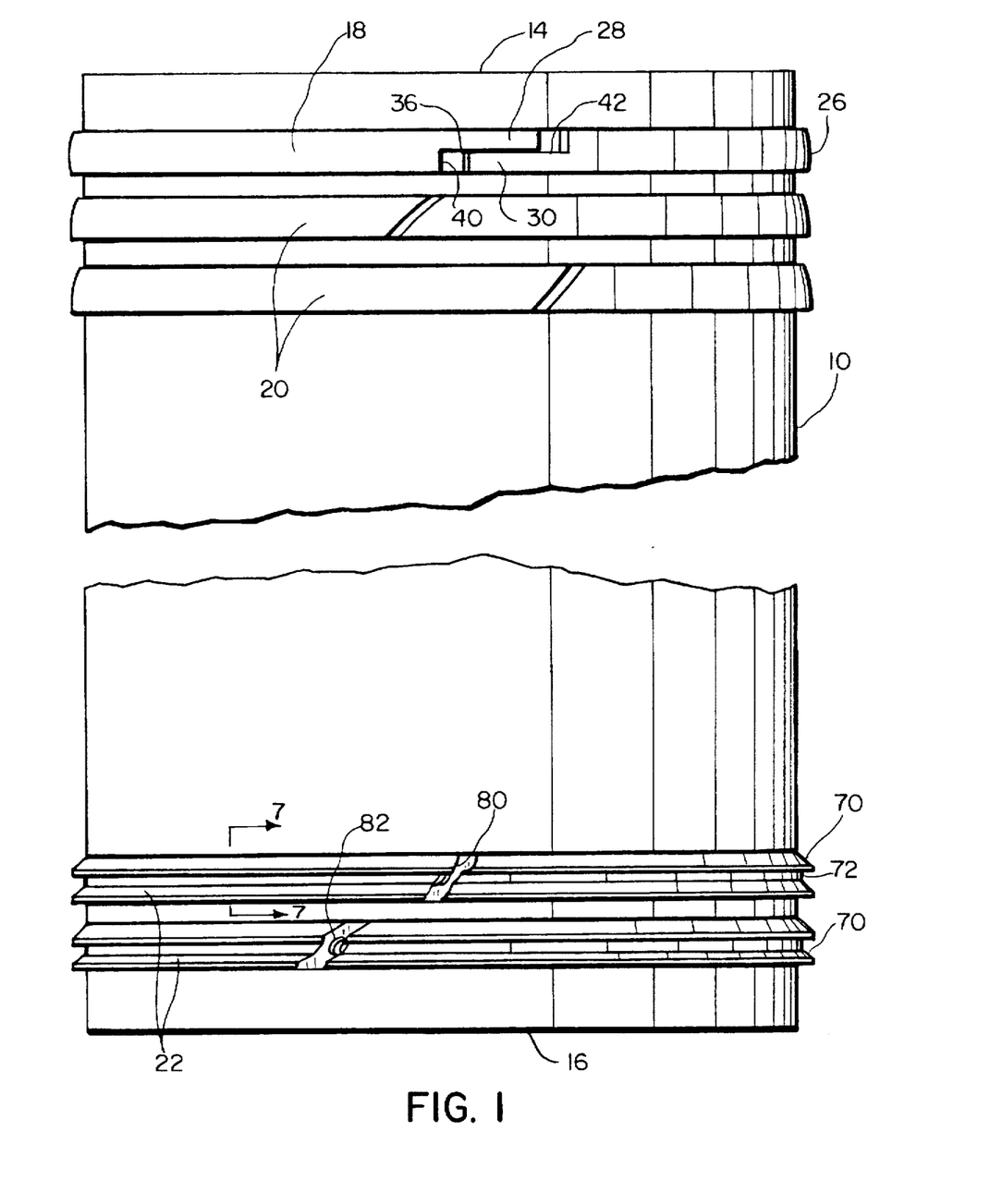
FIG. 1 shows a side elevation view of a piston for a large bore internal combustion engine having novel top ring, intermediate rings and scraper rings, thus illustrating a preferred embodiment of the invention.
Figures 2, 4:
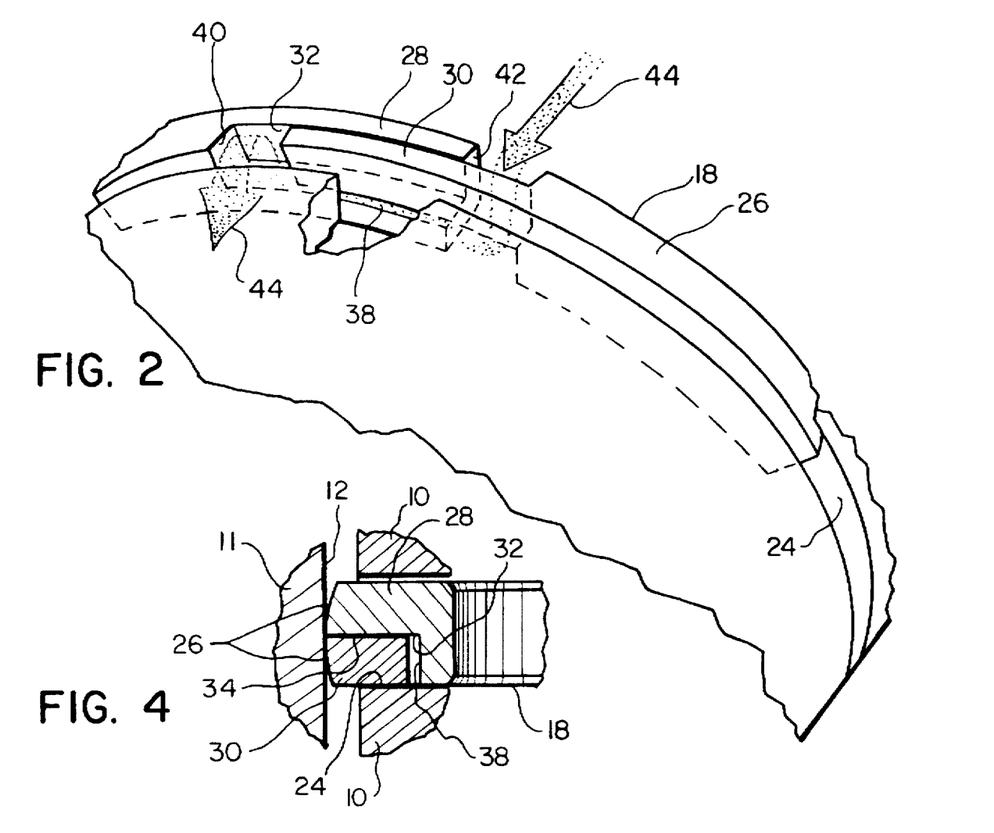
FIG. 2 shows a perspective view of an upper fragment of the piston and a portion of the top ring of FIG. 1.
FIG. 4 shows a cross-sectional view of the top ring of FIGS. 1-3 as viewed along cross-section lines 4—4 of FIG. 3 with a fragment of the piston of FIGS. 1-2 replaced and with a fragment of a surrounding cylinder wall added.
Figure 3:
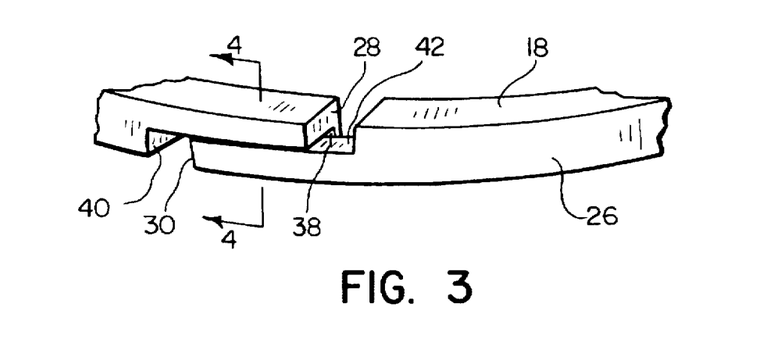
FIG. 3 shows another perspective view of a fragment of the top ring of FIGS. 1-2 with the piston of those figures being removed.

The top ring 18, as shown in FIGS. 1-4, comprises an annularly shaped resilient member, which may be constructed of any suitable material such as a metal, including, preferably, cast iron, which is sized for confinement in and around a radially outwardly opening annular groove 24 (FIG. 2 only) lo formed in and around a surface portion of the piston 10. The groove 24 and ring or member 18 are located near an upper end of the piston 10 and such member acts, along with the piston surface 14, as a first barrier for partially sealing off a lower end of the combustion chamber from a lower portion of the cylinder 11 (See FIG. 4) below the member. The member 18 projects radially out of the groove 24 and contains an outer surface 26, which may be crowned as shown in FIGS. 1 and 4, and which slidably bears against a surrounding engine cylinder wall 12.

The member 18 forms a lap joint between a first end portion 28 and a second end portion 30. The end portion 28 forms an inverted L-shaped structure as viewed in the drawing figures which defines a circumferentially extending notch 32 in and along a lower outer surface portion thereof. Neglecting the crown of the surface 26, the opposing end portion 30 is of generally rectangular cross-section, as viewed best in FIG. 4, and has an axial dimension which is sized to fit tightly within the notch 32 between an overlapping surface 34 of the end portion 28 and a lower surface 36 (See FIG. 1) of the groove 24. The end portion 30 which lies within the notch 32 has a radial dimension which is less than the radial dimension of the notch 32 for leaving a fluid passageway or gap 38 between opposing axially extending surfaces of the end portions 28 and 30 in the interior of the lap joint. Preferably, the radial dimension of the air passageway 38 should be from about 0.021 inches to about 0.028 inches for a ring having an outside diameter of 18.000 inches and an axial thickness of about 0.500 inches, although other radial gap dimensions may be suitable in certain circumstances. The resulting passageway 38 circumferentially extends the entire length of the overlap between the first and second end portions 28 and 30 and communicates, on opposite ends thereof, with a downwardly opening slot or end gap 40 located at a downstream end of the lap joint and with an upwardly opening slot or end gap 42 located at an upstream end of the lap joint, relative to exhaust gases formed in the combustion chamber above the member 18.

The passageway 38 thus provides a controlled leakage path of preselected and essentially constant radial dimension for combustion chamber gases or blow-by to flow through the lap joint of the ring 18, as illustrated by an arrowed gas path labeled 44 in FIG. 2, which gap dimension is essentially unaffected by ring wear of the outer surface 26, temperature extremes or even ring misalignment in the groove 24. Since the radial dimension of the passageway 38 is essentially unaffected by these factors, the ring 18 will not encounter substantially increased engine blow-by over its normal useful life as has been a long encountered problem with conventional top rings known in the prior art. Accordingly, while the slots 40 and 42 at opposite ends of the lap joint will widen as the outer surface 26 of the ring 18 wears, due to frictional sliding movement against the cylinder wall 12, as is also the case with conventional lap jointed rings, the dimensions of the air passageway 38 formed between axially extending opposing surfaces of the end portions 28 and 30 will remain essentially constant so that a relatively constant and acceptable amount of blow-by will pass therethrough throughout a normal, useful life of the ring. By contrast, the volume of blow-by through the lap joint of a conventional ring has a tendency to continually increase throughout the normal useful life thereof to an eventual unacceptable level as the outer surface of conventional ring wears away. Such increases in blow-by thus limit the useful life of conventional lap jointed rings by a substantial amount as compared to the extended useful life that will be obtained using the top ring of my invention.

The area of the passageway 38 can be varied to suit operating requirements of the engine in which the ring 18 is to be used. Also, the size of the ring 18, including its outer diameter, radial thickness and axial thickness, can have an effect on the area of the passageway 38 to be selected. Preferably, the area of the passageway 38 should not be less than a minimum area which will cause a maximum gas pressure differential to occur axially across the ring 18 which is more than about sixty percent of the total maximum gas pressure differential occurring axially across both the top ring 18 and a next lower ring mounted on the piston 10. A passageway area smaller than such a minimum area can produce scoring across the ring 18 which will substantially reduce its useful life and, moreover, may also result in scoring of the cylinder wall 12. On the other hand, the maximum area of the passageway 38 should, preferably, be no greater than that which will permit an acceptable maximum volume of blow-by through the ring 18 from the combustion chamber. An acceptable maximum volume of blow-by will usually be deemed to be approximately that amount occurring through a conventional top ring when that ring is first placed in service.

Figure 5:
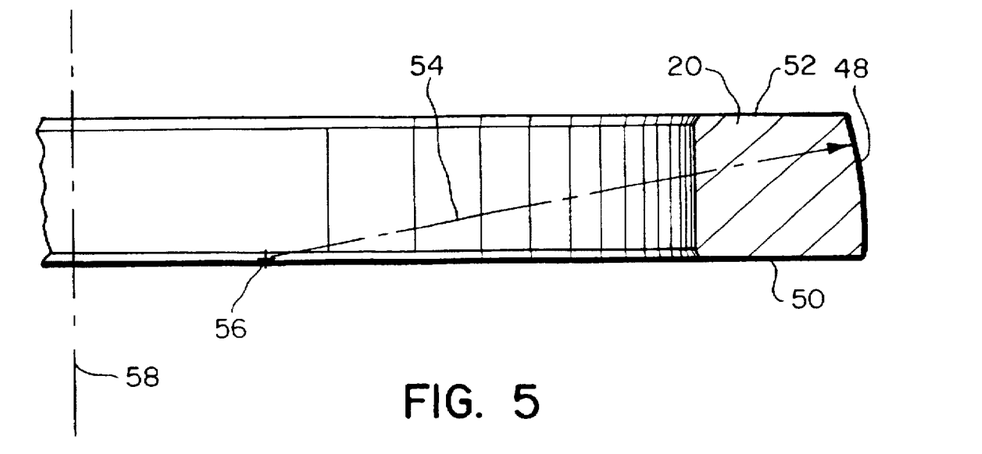
FIG. 5 shows a radial cross-section view of a fragment of an intermediate ring of FIG. 1 with the piston of the latter figure being removed.
Figure 6:
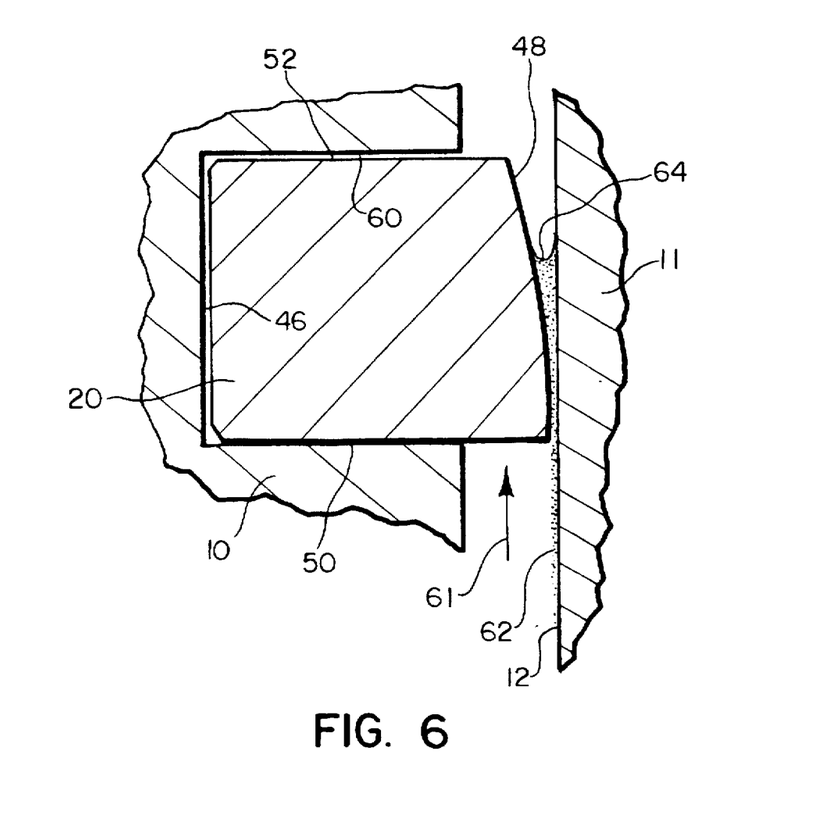
FIG. 6 shows an enlarged radial cross-section view of the intermediate ring of FIG. 5, the same as viewed in the latter figure with fragments of the piston of FIG. 1 and of a surrounding cylinder wall added.

The pair of split intermediate rings 20 of the piston 10, as shown in FIG. 1, are identical, such that only one such ring need be shown in detail in FIGS. 5–6 and explained. The ring 20 comprises an annularly shaped resilient member, which may be constructed of any suitable material such as cast iron. The member 20 is sized for confinement in and around a radially outwardly opening groove 46 (FIG. 6 only) which is formed in and around a surface portion of the piston 10. The member 20 projects radially out of the groove 46 and includes an arc shaped or barrel tapered outer surface 48 which slidably bears against the surrounding cylinder wall 12. The outer surface 48 is, preferably, shaped in the form of a circular convex arc. However, the arc shape need not necessarily be circular, but could be parabolic or other suitable arc shape. A lower radial dimension of the member 20, as measured in and along a plane containing a lower surface 50 thereof, is substantially greater than an upper radial dimension of the member as measured in and along a plane containing an upper surface 52 of the member. As illustrated in FIG. 5, an imaginary line 54, representing the radius of curvature of the surface 48, extends from a point 56 which lies both in the plane containing the lower surface 50 and a vertically extending plane containing the radius 54 and an imaginary axial center line 58 of the ring 20. The entire section shown in FIG. 5 lies within this vertical plane.

Similar to the relatively close fit of the top ring 18 in the groove 24 as previously explained, the ring 20 fits in the groove 46 so as to provide a slight gap between the upper ring surface 52 and an overlying surface 60 of the piston 10 which defines an upper surface of the groove 46. The vertical width of the gap is exaggerated in FIG. 6 for viewing clarity. The gap is present between the upper surface 52 of the ring 20 and the overlying surface 60 for most of the piston stroke as the piston 10 is in movement upwardly in the cylinder 11 as indicated by an arrow 61 in FIG. 6. Typically, lubricating oil 62 is splashed or otherwise deposited on and around the cylinder wall 12 from the engine crankcase when the piston 10 is at an near the upper end of its stroke. Then, on the down stroke of the piston 10, a lower outer edge portion of the ring surface 48 near the lower surface 50, tends to scrape a portion of the cylinder wall deposited oil 62 down the wall 12 ahead of the piston. But some of the oil on the wall 12, in the region across which the piston 10 passes during the down stroke, is left where originally deposited. Accordingly, as the piston 10 completes the down stroke and reverses direction, oil remaining on the wall 12 above the ring lower surface 50 tends to accumulate between the barrel tapered outer ring surface 48 and the wall 12 above the lower ring surface 50 as indicated in FIG. 6 at 64. As the piston 10 and ring 20 move upwardly again, a hydrodynamic pressure builds up in the accumulated oil quantity 64 due to the velocity of a lower portion of the outer surface 48 against the oil film 64 on the wall 12. The pressure increases from an upper portion of the quantity 64 moving downwardly through the quantity toward the lower ring surface 50 because of the squeezing effect that the arc shaped outer surface 48 has thereon during its upward travel. Consequently, a lower edge portion of the ring surface 48 is forced to move slightly away from the wall 12 by the pressure in the quantity 64 as the ring moves upwardly to cause the outer surface 48 to slide over the oil 64 rather than drag it upwardly along the wall. This inward movement is permitted because of the ability of the ring 20 to move slightly in the groove 46 in a radial direction as illustrated in FIG. 6 by the existence of a slight spacing between a radially outwardly facing surface of the groove 46 and an opposing surface of the ring 20. The arc shaped or barrel taper of the surface 48 has substantially less tendency to push or scrape oil ahead of it when the piston 10 is traveling upwardly in the cylinder 12 than does a conventional intermediate ring containing a linear taper. Accordingly, a substantial reduction in the burning of oil from the crankcase results from the use of the ring 20 as compared to that encountered using a conventional intermediate ring or rings. To be fully effective in this regard, the barrel taper of the surface 48 should be between about one and four degrees of arc between the upper and lower surfaces 50 and 52 for an intermediate ring 20 having an axial thickness of from 0.490 to 0.510 inches. For a standard outside ring diameter of 18.000 inches, and an axial thickness of from 0.490 to 0.510 inches, I recommend that the radius of curvature 54 be about 4.00 inches.

Figure 7:
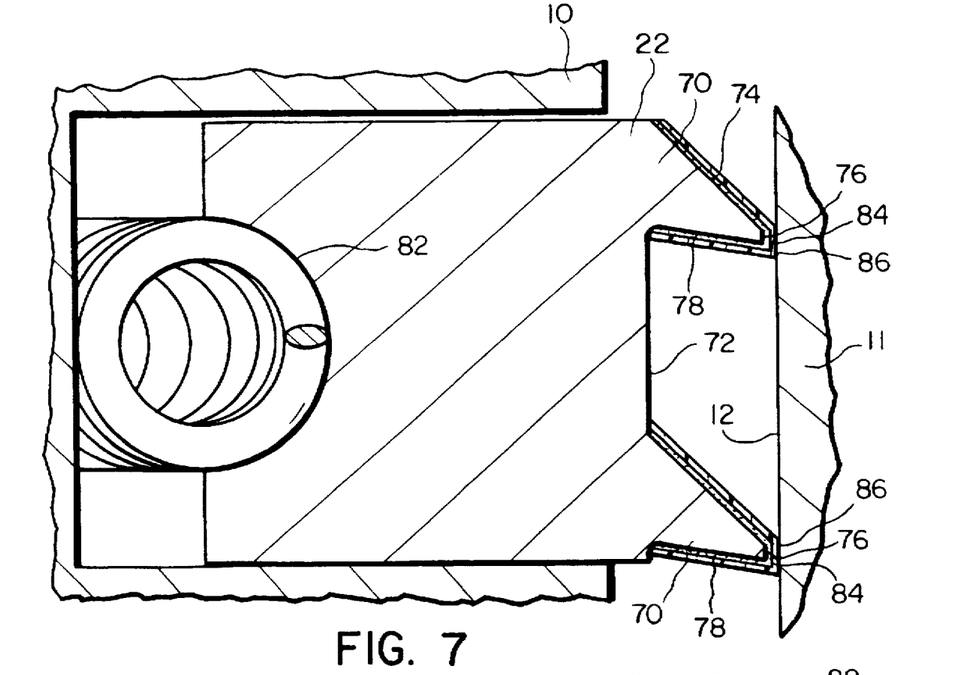
FIG. 7 shows a cross-section view of a fragment of the piston and of a scraper ring of FIG. 1 before break-in of the scraper ring, as viewed along cross-section lines 7—7 of the latter figure and with a portion of a surrounding cylinder wall added.
Figure 8:
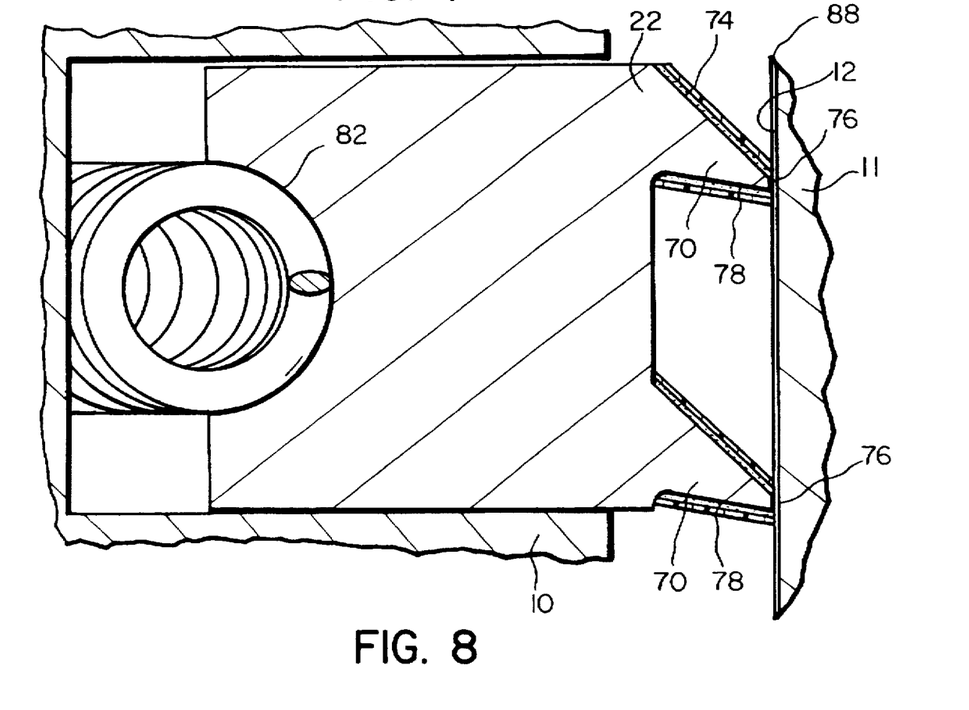
FIG. 8 shows a cross-section view of the scraper ring, piston and cylinder wall of FIG. 7 following break-in of the scraper ring but, otherwise, the same as viewed in the latter figure.

Referring now to FIGS. 1 and 7–8, the split scraper rings 22 will now be explained. As with conventional scraper rings, the rings 20 tend to scrape excess oil downwardly along the cylinder wall which has accumulated on the wall when the rings were at or near the upper end of their travel. The scraping action occurs as the piston 10 and rings 22 descend in the cylinder 11 from the upper end of their travel to a lower end thereof. Since the rings 22 are identical, only one such ring is shown in FIGS. 7–8 and need be explained. The ring 22 comprises an annularly shaped member which is sized to fit in and around a radially outwardly opening groove formed in and around a lower surface portion of the ring 10, the same as in the case of the rings 18 and 20 as previously discussed. As in the case of conventional scraper rings, the ring or member 22 may be constructed of a suitable material such as cast iron and contains a pair of skirts 70 which extend radially outwardly from a body 72 thereof toward the wall 12 of the cylinder 11. As is typical of these rings in present day use, the skirt 72 includes a diagonally outwardly and downwardly extending upper surface 74, a relatively short axially extending outer surface 76 and a lower surface 78. Also, as is conventional, the member 22 contains a diagonal butt joint 80 (FIG. 1 only) which is spanned by a coiled metal spring 82 which extends annularly around the member 22.

As is also conventional, the outer surface 76 contains a first coating 84 of manganese, nickel phosphate and iron having a thickness of about one mil, the thickness of which is greatly exaggerated in FIGS. 7–8 for viewing clarity. As is also conventional, a second coating 86 of friction reducing material, preferably containing fluoropolymers, including polytetrafluoroethylene (TFE), which is commonly known as teflon, is applied over the first coating 84 on the outer surface 76. As is well known, the coatings 84 and 86 tend to wear off of the outer surface 76 after the member 22 has been in service for a short period of time. This will usually occur during the initial engine breakin period.

In accordance with the present invention, I apply both the first or primer coating 84 and, then, the second or outer coating 86, not only to the outer surface 76 of the skirts 70, as is conventional, but, also, in continuously extending first and second coatings to the adjacent surfaces 74 and 78 as shown in FIG. 7. As a result, even after the portions of coatings 84 and 86 wear away from the radially outer surface 76, the remaining coatings on the adjacent upper and lower skirt surfaces 74 and 78 will have radially outer edges which continue to rub against the cylinder wall 12 as the piston 10 reciprocates as shown in FIG. 8. This continued rubbing causes microscopic pieces of the outer coating 86 in particular, to break away from outer edges of the surfaces 74 and 78 to form a thin friction reducing film 88 on the wall 12 which is operative to reduce sliding friction of the rings 22 against the wall 12 long after the normal engine break-in period has ended and long after the film 86 is completely worn from the outer surface 76 of the ring 22 as well as from the outer surface of conventional wiper rings. Coincidentally, such a continuous coating on the surfaces adjacent to the outer surface 76 also enhances the oil wiping action of the scraper ring 22 which, because it is also applied to the adjacent surfaces, will continue to be effective for this purpose long after the friction reducing coating on the outer surface is worn away. The primer coating is preferably of a thickness of from about 0.0001 to 0.002 inches and the preferred thickness of the fluoropolymer coating is from 0.0005 to 0.002 inches. One example of a suitable outer coating 86 is that presently available from Southwest Impreglon Sales, Inc. of 15014 Lee Road, Houston, Tex. 77032.

Although the present invention has been described with respect to specific details of a certain preferred embodiment thereof, it is not intended that such details limit the scope and coverage of this patent other than as expressly set forth in the following claims.

I claim:

1. A set of rings for a piston of an internal combustion engine, a series of rings comprising a split top ring including an annularly shaped resilient first member sized for confinement in and around a first radially outwardly opening annular groove formed in and around a surface portion of an internal combustion engine piston relatively near an upper end thereof, said first member projecting radially out of said first piston groove for slidably bearing against a surrounding engine cylinder wall, said first member forming a lap joint between a first end portion and a second end portion thereof, said first end portion having an inverted L-shaped structure defining a circumferentially extending notch in and along a lower outer surface portion thereof, said second end portion having an axial dimension sized for close fitting within and along said notch between an overlapping surface of said first end portion and a lower surface portion of said first piston groove and having a radial dimension which is less than the radial dimension of said notch for defining a fluid passageway between opposing axially extending surfaces of said first end portion and said second end portion, said passageway extending between and communicating with a downwardly opening slot between said end portions which is located at a first end of said lap joint and an upwardly opening slot which is located at a second end of said lap joint;

at least one split intermediate ring including a second annularly shaped resilient member sized for confinement in and around a second radially outwardly opening annularly shaped groove formed in and around a surface portion of said piston which is axially spaced below said first groove, said second member also being sized to project radially out of said second piston groove for slidably bearing against said cylinder wall, said second member defining an arc shaped outer surface for slidably bearing against said cylinder wall, wherein a first radial dimension of said second member, as measured in and along a plane containing a lower surface of said second member, is greater than a second radial dimension of said second member as measured in and along a plane containing an upper surface of said second member; and at least one split scraper ring including a third resilient annularly shaped member sized for confinement in and around a third radially outwardly opening annularly shaped groove formed in and around a surface portion of said piston which is spaced below said second groove and which is sized to project radially out of said third groove for slidably bearing against said cylinder wall, said third member including at least one radially outwardly projecting skirt defining an upper surface, an axially extending outer surface and a lower surface, said upper, outer and lower surfaces containing a continuous friction reducing outer coating having a thickness of from about 0.0005 inches to about 0.002 inches.

2. The set of rings of claim 1 wherein said third member further comprises a primer coating applied to said upper, outer and lower surfaces of said skirt which consists essentially of manganese, nickel phosphate and iron to a thickness of between about 0.0001 inches and about 0.002 inches, said outer coating being applied over said primer coating.

3. The top ring of claim 1 wherein the area of said passageway is at least equal to a low value which limits the maximum pressure differential across said top ring to about sixty percent of the total pressure differential existing across both said top ring and a next lower intermediate ring, and wherein the area of said passageway is less than a high value at which the volume of blow-by through said passageway becomes unacceptably high.

4. A split top piston ring for a piston of an internal combustion engine, said ring comprising an annularly shaped resilient member sized for confinement in and around a radially outwardly opening annular groove formed in and around a surface portion of an engine piston and for projecting radially out of said piston groove for slidably bearing against a surrounding engine cylinder wall, said member forming a lap joint between a first end portion and a second end portion thereof, said first end portion having an inverted L-shaped structure defining a circumferentially extending notch in and along a lower outer surface portion thereof, said second end portion having an axial dimension sized for close fitting within and along said notch between an overlapping surface of said first end portion and a lower surface of said piston groove and having a radial dimension of the portion thereof which lies within the notch which is less than the radial dimension of said notch for defining a fluid passageway between opposing axially extending surfaces of said first end portion and said second end portion, said passageway communicating between a downwardly opening end gap between said end portions which is located at a first end of said lap joint and an upwardly opening end gap which is located at a second end of said lap joint.

5. The top ring of claim 4 wherein said member is constructed of metal.

6. The top ring of claim 4 wherein the radial dimension of said passageway is between about 0.005 inches and about 0.030 inches.

7. The top ring of claim 4 wherein a radially outer surface of said ring is crowned.

8. The top ring of claim 4 wherein radially outwardly facing surfaces of said first end portion and said second end portion together form a continuous crowned surface.

9. A split scraper ring for a piston of an internal combustion engine, said ring comprising a resilient annularly shaped member sized for confinement in and around a radially outwardly opening groove formed in and around a surface portion of an engine piston and for projecting radially out of said piston groove for slidably bearing against a surrounding engine cylinder wall, said member including at least one radially outwardly projecting skirt defining an upper surface, an axially extending outer surface and a lower surface, said upper, outer and lower surfaces containing a continuous friction reducing outer coating having a thickness of from about 0.0005 inches too about 0.002 inches such that, upon wearing away of said outer coating from said outer skirt surface during break-in of said engine, further sliding movement of said skirt against said cylinder wall causes portions of said outer coating located on said upper and lower surfaces, which then rub against said cylinder wall, to break away and continue to apply a friction reducing outer coating to said cylinder wall following break-in of said engine, said member further comprising a continuous primer coating applied to said upper, outer and lower surfaces of said skirt which consists essentially of manganese, nickel phosphate and iron to a thickness of between about 0.0001 inches and about 0.002 inches, said outer coating being applied over said primer coating.

10. The scraper ring of claim 9 wherein said member includes a diagonal butt joint between opposing ends thereof.

11. The scraper ring of claim 9 wherein said upper surface comprises a diagonally downwardly and radially outwardly extending surface.

12. The scraper ring of claim 9 wherein opposing split ends of said member are spanned by an expandable spring.

13. A split compression zing for disposition into and around an annularly shaped, radially outwardly opening groove formed in a body, said ring comprising a resilient annularly shaped member forming a lap joint between opposite end portions thereof, said end portions defining a first axially upwardly opening end gap located at one end of said lap joint, a second axially downwardly opening end gap located at an opposite end of said lap joint from said first end gap, and a passageway located between said end portions which extends through said lap joint between said first end gap and said second end gap for carrying a preselected quantity of fluid from said first end gap to said second end gap.

14. The ring of claim 13 wherein a first one of said end portions is L-shaped in radial cross-section, so as to form a notch in a lower radially outwardly facing surface portion thereof, and wherein a second one of said end portions is generally rectangularly shaped in radial cross-section, said first one of said end portions covering an upper surface and a radially inwardly facing surface of the second one of said end portions, said radially inwardly facing surface being spaced from an opposing radially outwardly facing surface of said first one of said end portions to form said passageway.

15. The ring of claim 14 wherein radially outwardly facing surfaces of said first one and said second one of said end portions together form a continuous crowned surface.

\* \* \* \* \*

UNITED STATES PATENT AND TRADEMARK OFFICE
CERTIFICATE OF CORRECTION

PATENT NO. : 5,779,243
DATED : Jul. 14, 1998
INVENTOR(S) : Paul C. Hanlon, Shepherdsville, KY It is certified that error appears in the above-indentified patent and that said Letters Patent is hereby corrected as shown below:

Col. 4, line 16, "lo" should be deleted

Col. 10, line 16, Claim 13, "zing" should read --ring--

Signed and Sealed this

Twenty-second Day of September, 1998

Attest:

BRUCE LEHMAN

Attesting Officer     Commissioner of Patents and Trademarks